Feb. 5, 1935. A. KINDELMANN ET AL 1,989,754
APPARATUS FOR ADVANCING FILM ACROSS A SOUND APERTURE
Filed April 4, 1931 6 Sheets-Sheet 3

INVENTORS
Albert Kindelmann.
Ewald Boecking.
BY
Austin & Dix
ATTORNEYS

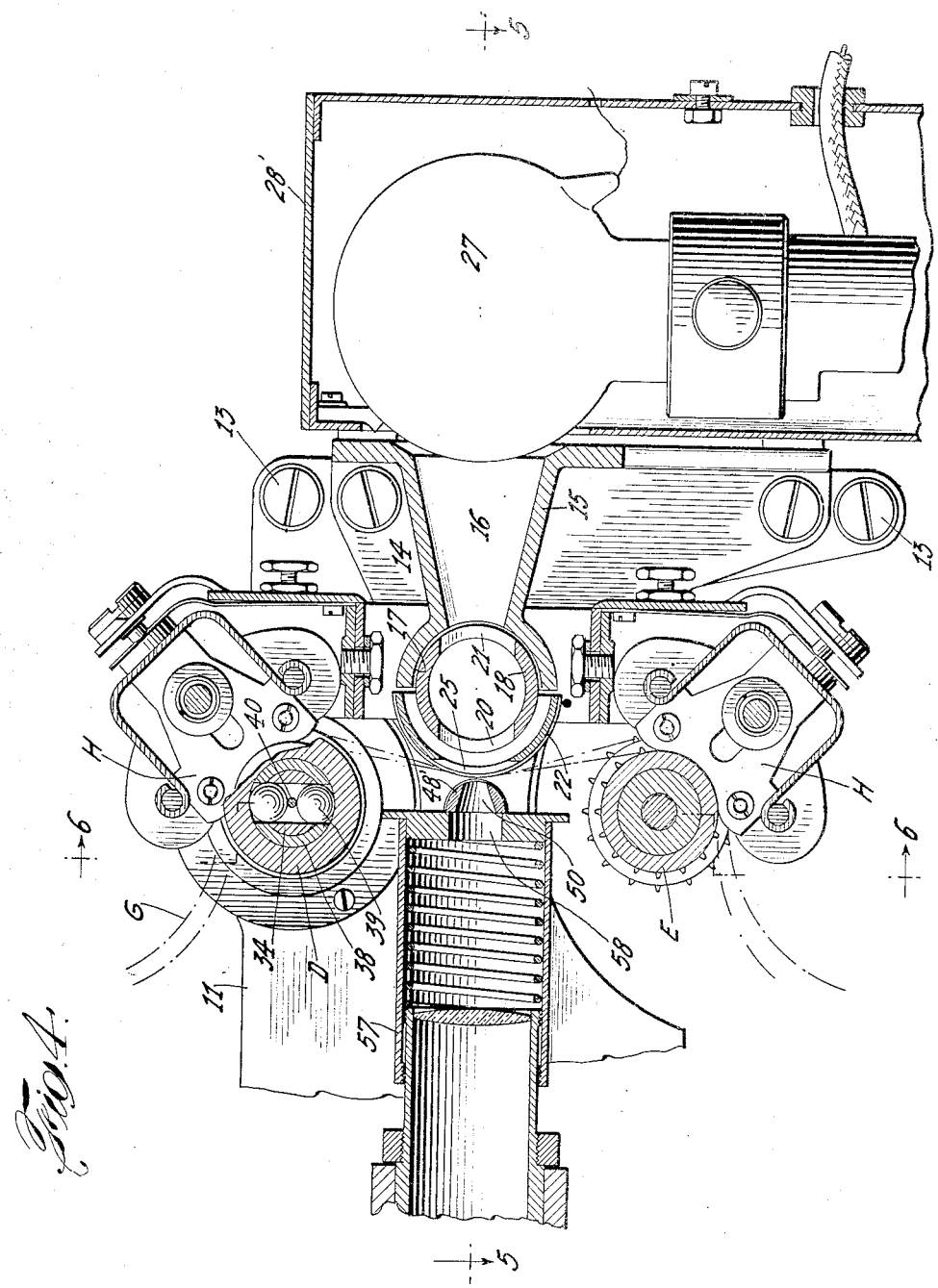

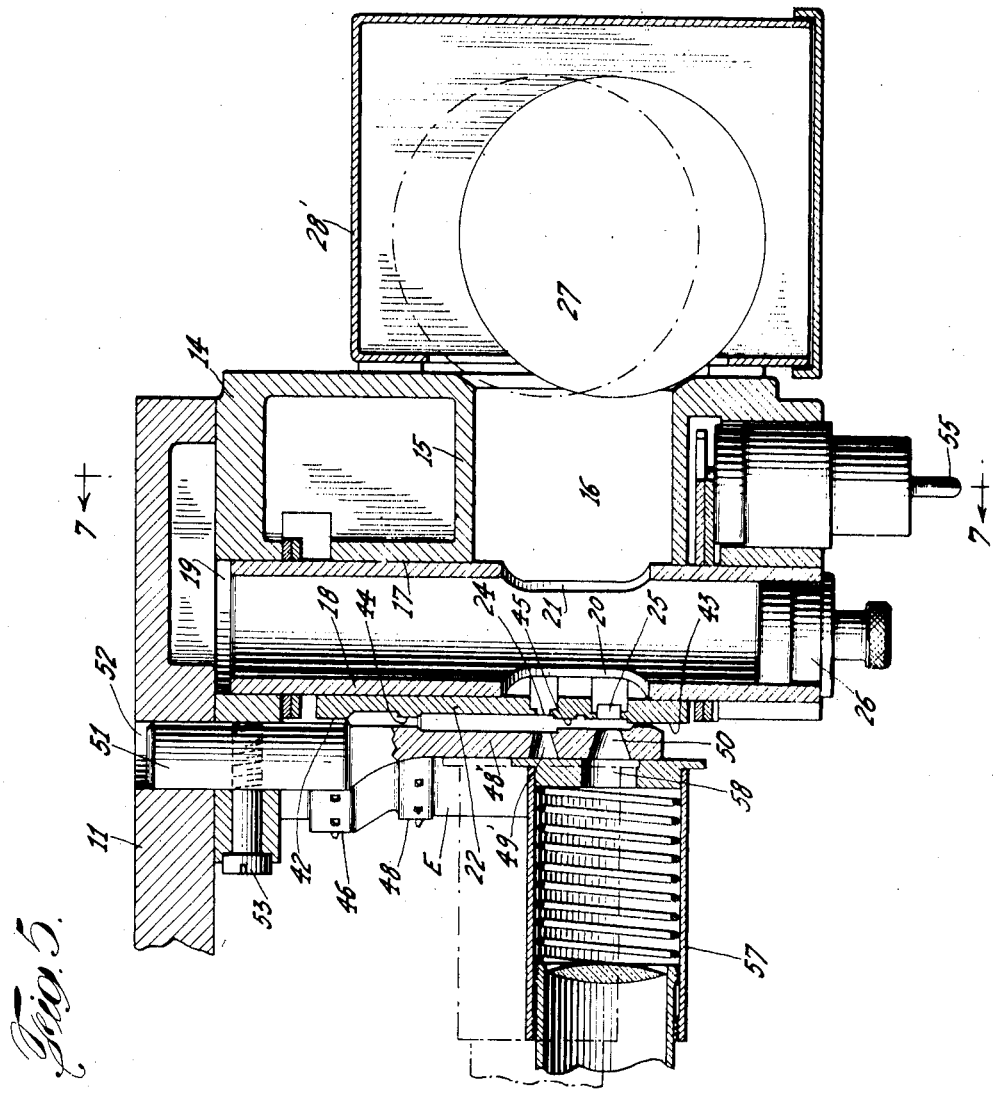

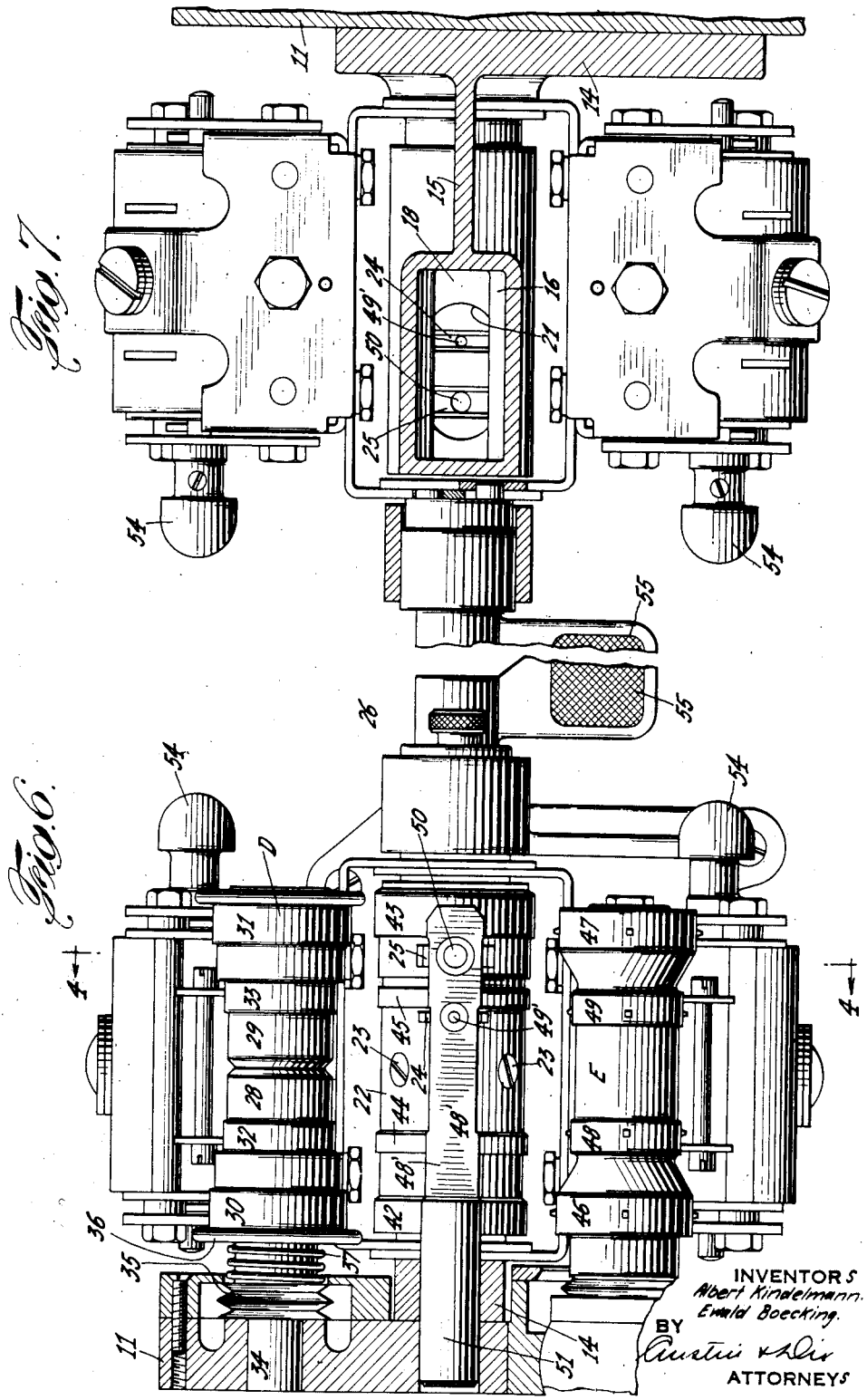

UNITED STATES PATENT OFFICE 1,989,754

APPARATUS FOR ADVANCING FILM ACROSS A SOUND APERTURE

Albert Kindelmann, Floral Park, and Ewald Boecking, Brooklyn, N. Y., assignors to International Projector Corporation, New York, N. Y., a corporation of Delaware Application April 4, 1931, Serial No. 527,758

15 Claims. (Cl. 179—100.3)

This invention relates to new and useful improvements in talking picture projectors, and has especial reference to the construction and operation of the sound units thereon.

A main object of the invention is to provide a sound unit which is quickly and easily adaptable for use either with a narrow or wide film, that is with either the 35 m/m., or the 70 m/m. film, or otherwise.

A further object is to provide a sound unit wherein the exciter lamp, the lens tubes, the photo-electric cell and the film trap may be quickly and easily manipulated to properly receive the film, and to adjust the several elements of the unit with respect to the film, whether it is a wide film or a narrow film.

A still further object is to provide a film sound trap which will hold the film firmly in position in registry with the openings in the trap and having such a condition of tension as to eliminate vibration or fluttering of the film.

A still further object is to provide a system of film engaging sprockets, rollers and shoes which will facilitate instantaneous threading and removal of the film from the trap and adaptation of the trap elements to one kind of film or another.

Further and more specific objects, features and advantages will more clearly appear from a consideration of the specification hereinafter taken in connection with the accompanying drawings which form part of the specification and which illustrate a present preferred form of the invention.

The invention has to do with a talking picture projector in which a narrow or wide film is adapted to be used, preferably of 35 m/m. or 70 m/m. size or other widths. The invention concerns the provision of a simple, compact, efficient trap element which may be readily removable for replacement and repair and constructed for economical manufacture and efficient operation. The invention further includes the combination of a trap constructed to pass the film thereover in a taut condition along a non-linear line combined with a lens and exciter lamp unit which is shiftable to align the optical axis of the sound unit with either of two openings in the film trap. The invention further includes the combination of an additional feature wherein the film is passed between an idler roller and a sound sprocket over a non-linear path and over smooth accurately machined surfaces to eliminate the substantial wear of the film and to insure absolute accuracy of registration. By non-linear motion of the film the applicant means that the film does not move from the idler roller to the sound sprocket in a straight line but moves therebetween either in a series of straight lines angularly related or in a curved line or a combination of both.

The invention includes film engaging elements forming part of the film trap which can by a movement on the part of the operator be adjusted to clamp or release the film and capable of being adaptable for engagement with one type of film or another with a minimum of movement. These trap elements are combined in their operation with a readily adjustable photo-electric cell and exciter lamp and lens unit to enable the operator to effect this alignment for combination with one film or another in a minimum of time.

The preferred form of the invention is shown in the drawings, of which:

Fig. 4 is a longitudinal section taken on the line 4—4 of Fig. 6.

Fig. 5 is a horizontal section taken on the line 5—5 of Fig. 4;

Fig. 6 is a transverse section taken on the line 6—6 of Fig. 4; and

Fig. 7 is a vertical transverse section taken on the line 7—7 of Fig. 5.

The preferred form of the invention is adapted to be embodied in and form part of a modern motion picture projector in which sound is produced simultaneous with the projection of pictures. The projector embodying the invention and of modern type is shown in Fig. 1 in side elevation and preferably comprises the following main elements, an upper film sprocket A, a projection film trap indicated at B, the intermittent film sprocket C, the upper sound film roller D, a continuously uniformly moving sound film sprocket E and the take-up sprocket F.

In the normal operation of the machine the film passes around the upper sprocket A down through the projection film trap B around the intermittent sprocket C over the roller D, around the sprocket E and sprocket F into the lower magazine. As the film passes between the roller D and the sprocket E, it passes through the sound film trap which constitutes an essential part of the invention herein.

The machine herein is adapted to accept and project films of different widths. This particular machine may use without change a 35 m/m. film and then a 70 m/m. film or vice-versa. It is to be understood that sprockets may be changed to accept these films of different widths.

Figure 1:
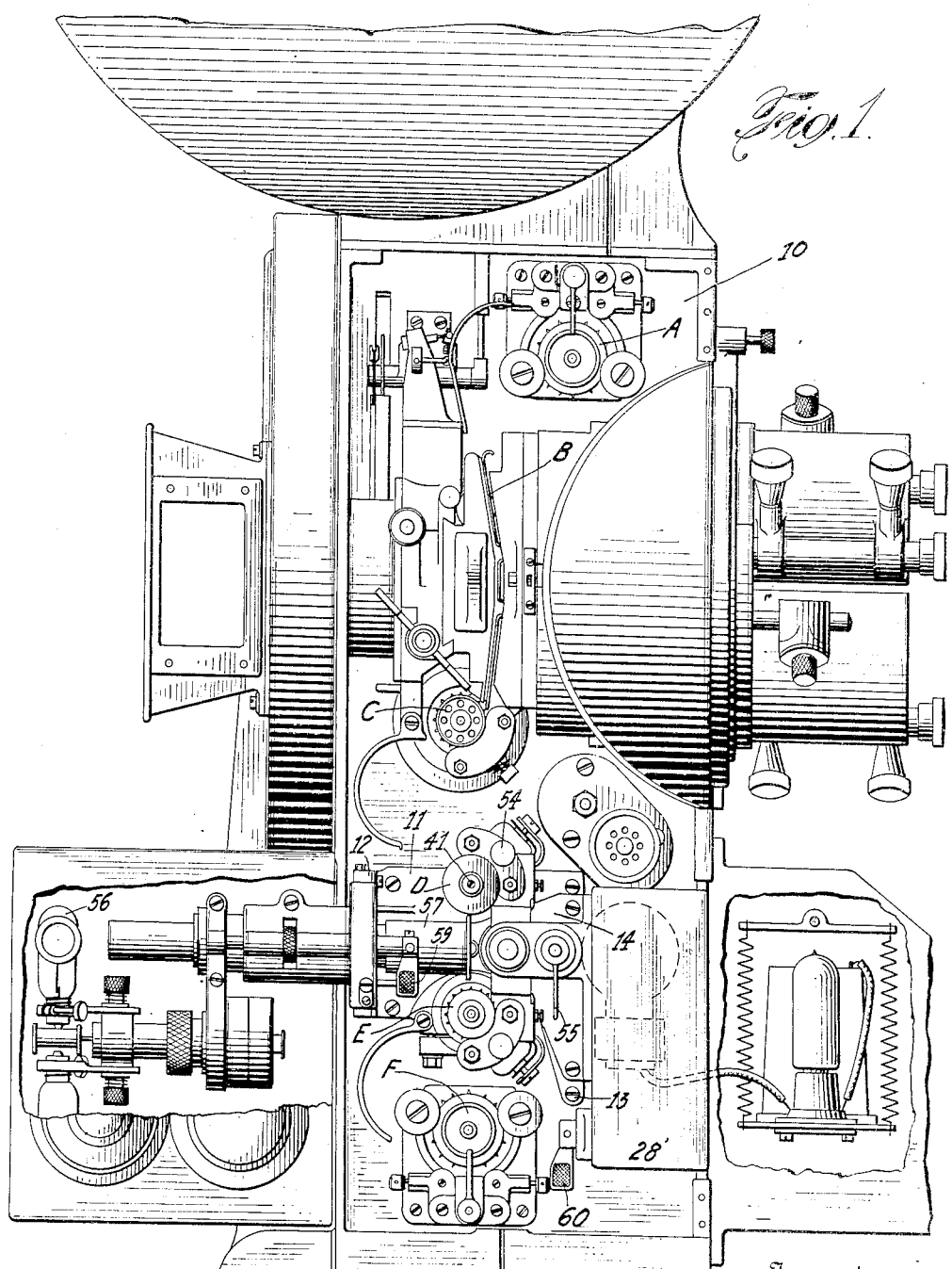
Fig. 1 is a side elevation of a motion picture projector adapted for talking picture projection and embodying the invention herein.

As shown in Fig. 1, the major portion of the mechanism of the projector is mounted on and supported by a vertical central partition plate 10. As far as the sound unit of the projector is concerned it is supported from the main partition or frame 10 by means of an L-shaped plate shown in Fig. 3, and having one leg in the form of a plate 11 and the other at right angles thereto in the form of a plate 12. This bracket is connected to the main partition or frame 10 by suitable means such as bolts 13.

It will be observed that to the face of plate or limb 11 of the bracket member there is fastened by suitable screws a supporting plate 14 having a horizontal extending rib 15 and a longitudinally extending tapered way 16 therein open at both ends and connected at one end to a semi-circular seat indicated by the numeral 17 in Figs. 4 and 5. This semi-circular seat extends at right angles to the plane of the frame 10. Lying adjacent to and disposed in said semi-circular seat is a tubular member or sleeve 18 snugly seated at one end in a bore 19 in the plate 14, see Fig. 5. This sleeve 18 is provided with oppositely disposed openings 20 and 21 in line with the passage 16. Disposed to one side of the sleeve 18 especially on the side having the opening 20 opposite the passage 16, is a semi-circular sleeve 22. This sleeve 22 is shown in Fig. 6, and may be fastened to the sleeve 18 by suitable means such as screws 23. In line with the openings 20 and 21 in the sleeve 18, semi-circular sleeve 22 is provided with spaced vertically disposed slots such as 24 and 25, Fig. 5. The sleeve 18 is snugly fitted into the bore 19 and has a cap 26 disposed in the other end thereof. This sleeve 18 and semi-circular sleeve 22 may be easily removed from the machine by merely pulling them out of the bore 19.

These two sleeves thus mounted form a partition member of a sound film trap over which the film G passes. It will be observed that film passing over the semi-circular sleeve 22 will pass the slots 24 and 25 in a curve as shown in Fig. 4, in its travel from roller D to and around sprocket E. This curvature in the film is then drawn over the sleeve 22 which acts as a sound film gate and tend to keep the film taut.

The two slots 24 and 25 in the gate 22 are of different widths and are adapted to pass light therethrough which is thrown on the film. This light passing through the openings 20 and 21 continues through the passage 16 to be directed on a photo-electric cell 27, suitably mounted and supported in a casing 28' from a portion of the supporting member 14. The smaller slot 24 is adapted to pass light which has been thrown through the sound track of a film of smaller width such as 35 m/m. film, whereas the larger slot 25 is adapted to pass light after it has passed through the sound track of a greater width such as 70 m/m.

Figure 2:
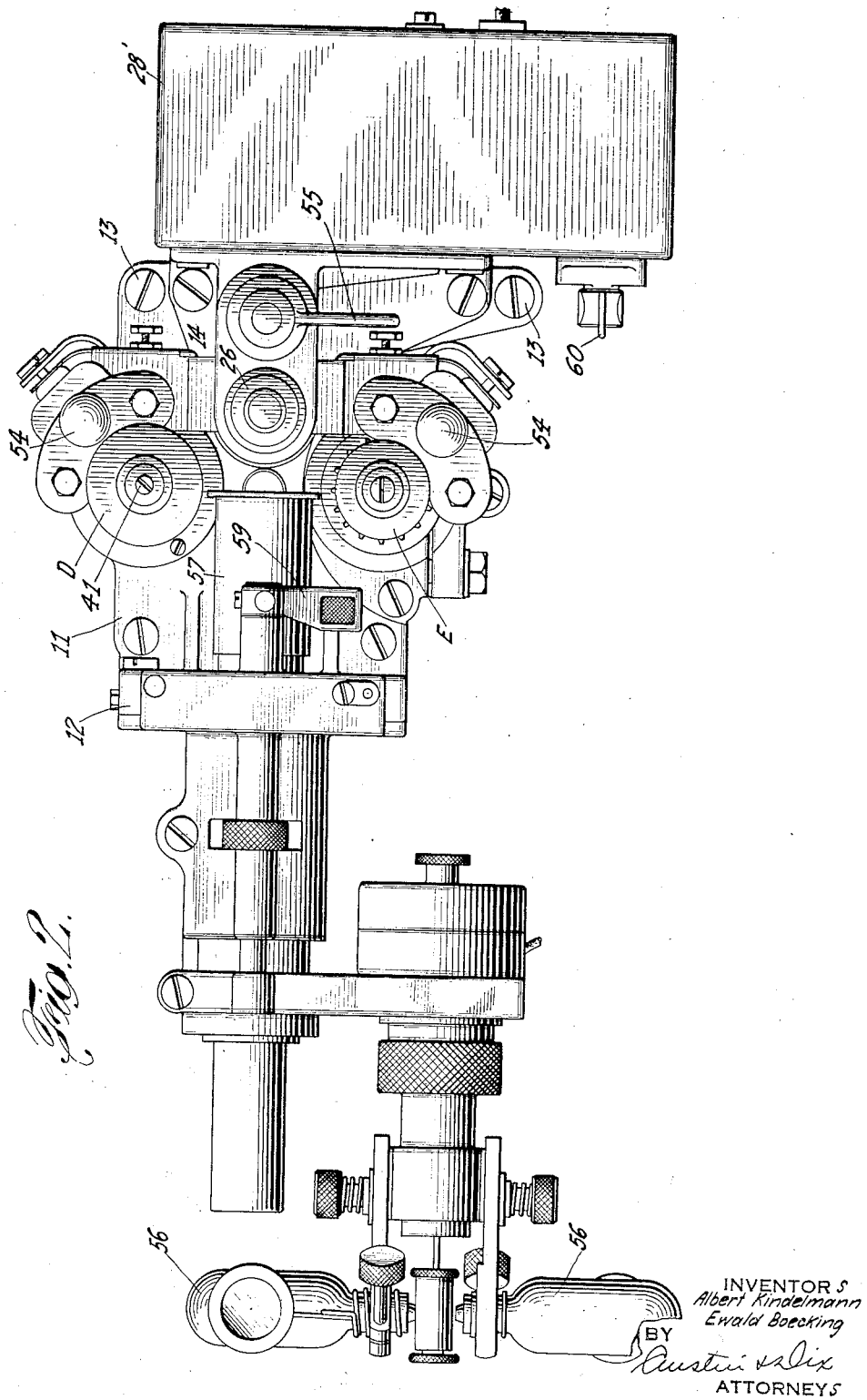
Fig. 2 is a side elevation of that part of the projector shown in Fig. 1 which embodies the invention and shown in enlarged form.
Figure 3:
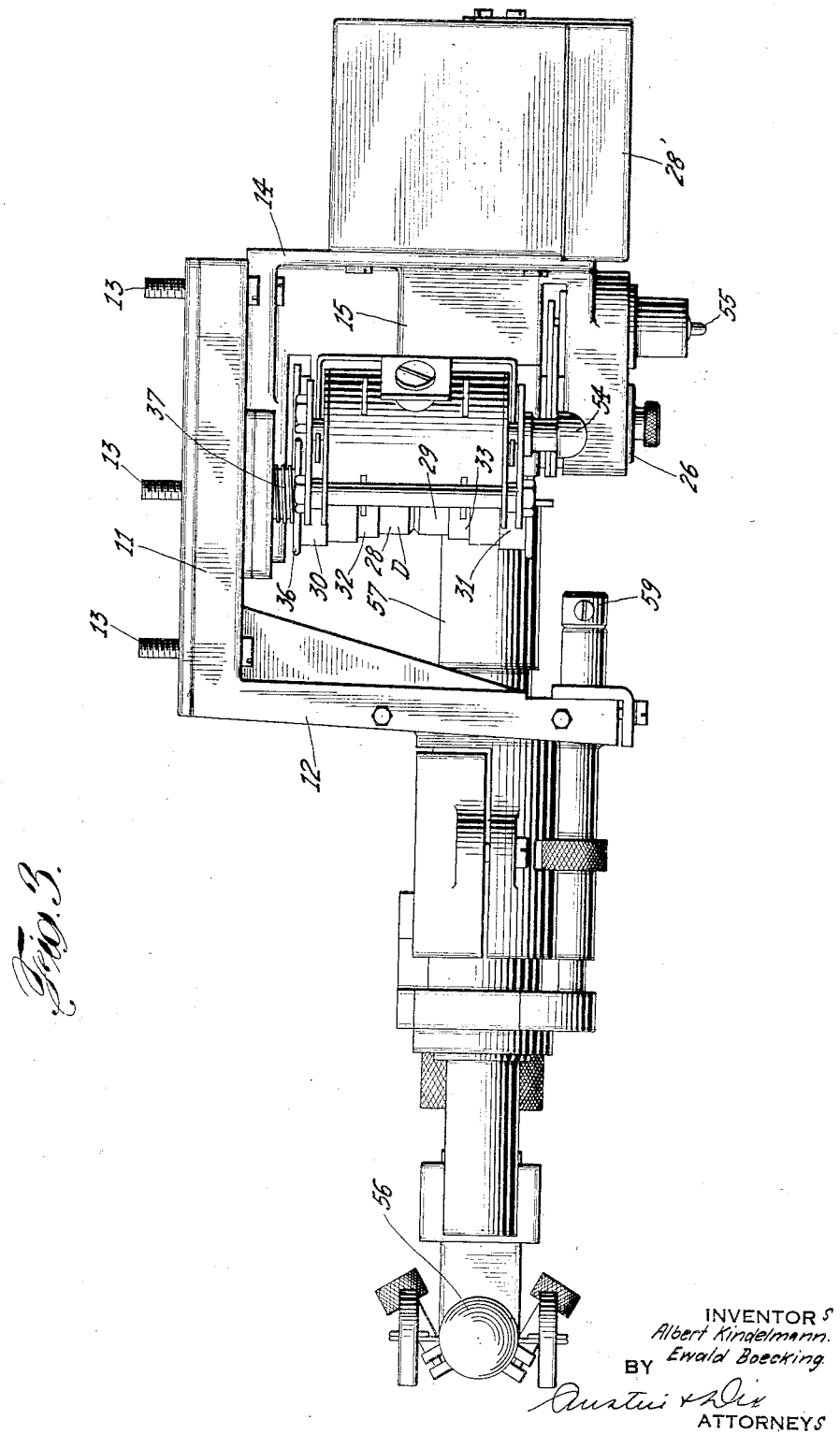
Fig. 3 is a plan view of the structure in Fig. 2.

Observing in Fig. 6, the idler roller D it will be seen that this roller is made up of two identical halves 28 and 29 which have pairs of shoulders 30 and 31, and 32 and 33. The shoulders 30—31 receive the edges of the wider film and the shoulders 32—33 receive the edges of the narrower film. As shown in Figs. 3 and 6, the half portion 28 of this roller D is slipped onto a shaft 34 journalled in the plate 11. This portion is provided with a hub 35 and a flange 36 with a spring 37 surrounding the hub and bearing against the flange to force the portion 28 to the right against the portion 29. This last portion identical in shape with the portion 28 is provided with a hub 38, see Fig. 4, which slips over the shaft 34. This shaft within portion 29 is provided with a slit containing balls 39 bearing against the inner face of the roller and extended to engage the same to hold it in position thereon by means of a tapered pin 40 advanced or retracted by means of a screw head 41 attached thereto as shown in Fig. 2. The portion 29 is then held firmly in proper position by means of the engagement of the ball 39, and the portion 28 is held in proper position thereagainst by means of the spring 37. This roller or idler member over which the film passes is adapted to rotate by reason of the fact that the shaft 34 is smoothly journalled in plate 11, and is provided with these two pairs of flanges above mentioned, to receive different widths of film. It will be noted that one pair of flanges is positioned at a greater distance from the axis of the roller than the other pair.

It will be similarly noted that the face of sleeve 22 (Figs. 5 and 6), is provided with shoulders 42 and 43, and 44 and 45, adapted to respectively receive the edges of the two films and that these shoulders are at different distances from the center or axis of the sleeve 18.

Below the sound film trap of which the sleeves 18 and 22 form a part, the uniformly driven sprocket E is located and is provided with pairs of toothed surfaces 46—47 and 48—49 to respectively receive and engage the edges of corresponding width films. These surfaces being at respectively different distances from the axis of the sprocket E which is driven uniformly by any suitable means not shown.

The other element of the sound film trap which cooperates with the sleeve 18 and 22 to form the film trap is a plate 48' extending as shown in Figs. 4, 5, and 6 across parallel to the face of sleeve 22 and having tapered apertures 49' and 50 therein of different sizes and aligned respectively with slots 24 and 25 in the sleeve 22. This plate 48' is mounted on a stud 51 fastened firmly in a bore 52 in the plate 11 by means of set screw 53. This set screw is mounted on the plate 14 and passes right through a hole in the stud 51 to hold it firmly in position whereby the accurate and exact alignment of tapered light openings 49' and 50 with slots 24 and 25 may be achieved.

The film G whether it is a wider or a narrower film passes over the idler D and beneath certain pressure feet or shoes H. Either of the films in passing around the sound sprocket E also pass shoes H which are constructed and arranged to be in pairs so that one element of the shoe will engage one width of film and the other element of the shoe will engage the other width of film merely by turning of a simple knob such as 54, shown in Fig. 2. Both sets of shoes may be advanced toward the respective roller and sprocket or retracted therefrom simultaneously by manipulation of a handle 55 shown in Fig. 2. This mechanism and operation is described in detail in the copending application above-mentioned.

The limb 12 previously mentioned extends transverse to the frame plate or partition 10 and acts as a support for the exciter lamp 56 and the lens tube unit indicated by the numeral 57. This lens tube unit 57 extends forward and bears against the adjacent face of plate 48'. The unit 57 has an opening 58 therein which is adapted respectively to align with the tapered light opening 49' or 50 as the exciter lamp and the lens tube unit as one are moved laterally into alignment with either opening 49' or 50 as indicated by the full and dotted lines in Fig. 5. This lateral shifting of the exciter lamp and the lens tube unit is effected by means of a hand lever 59 shown in Fig. 2.

The photo-electric cell 27 is mounted within the casing 28' on a suitable support which is shiftable by movement of lever 60 seen in Figs. 1 and 2, to move the cell 27 to the position shown in full and dotted lines in Fig. 5.

This mechanism may be any suitable eccentric, cam, or pin and slot mechanism (not shown).

Thus, the device herein discloses a combination of means for guiding the film in a non-linear path and in a taut condition through a sound film trap whether the film is of one width or another. Either film passes over an idler roller on suitable bearing surfaces therein and beneath the spring pressed shoes and continues through the trap and over a uniformly moving sound sprocket beneath the shoes. The film sound track whether for one size film or the other is in proper registration with a suitable combination of slot and light openings so that light from the exciter lamp will pass therethrough to the photo-electric cell. The exciter lamp with its associated lens tube unit can be readily shiftable by turning of a handle to any one direction or another and consequently align it with the proper sound track on the film being used. The photo-electric cell may readily be shifted to one or another of the desired positions by the movement of the handle. When the film is to be taken out or re-threaded or examined, the two sets of shoes and the respective roller and sprocket can be withdrawn by the movement of the handle. When the shoes are withdrawn after a wide film has been used and it is desired to use a narrow film, then by simply turning a knob in connection with each set of shoes, there will be moved the proper shoe element into position for contact with the narrow film. Combination of the film trap, the exciter lamp, the lens tube unit, and the photo-electric cell is such as to provide a substantially close, compact path or channel for the light traveling from the exciter lamp through the lens and the film to the cell. The curved or cylindrical slotted sleeve over which the film passes in a taut condition and through a non-linear path is detachable from its support which is an ordinary sleeve snugly fitted into a bore in the main support and can be made to the manufactured fineness with much more dispatch and economy of operation than if it were not so related and detachable from this support.

In the operation of the device, assuming that a narrow film is to be passed through the machine, the handle 55 will be turned to retract both sets of shoes from the roller D and the sprocket E. The knobs 54 will then be turned to set the proper shoe element in position to contact with this narrow film and not to contact with the other set of elements which are adapted to engage with wide film. At the same time the handle 60 is moved to move the cell 27 to the dotted position shown in Fig. 5 whereby it is directly in line with the slot 24 for the narrow film. Lever 59 is then turned to shift the exciter lamp and the lens tubes to the dotted position shown in Fig. 5 so that the opening 58 will be line with the proper light opening 49' in the plate 48'. This will, therefore, align the exciter lamp and the slot 27 through the cooperating tubes, slots and openings. The film is then threaded over the roller and around the sprocket whereupon the handle 55 is moved to advance the shoes into position to bear against the film. The drive mechanism is then started and the film is drawn by the sprocket E down over the roller D between the trap elements formed by the cylindrical plate 22 and the plate 48'. The narrow film will pass over the shoulders 32 and 33 of the respective portion of the roller D and will bear on the surface or shoulders 44—45 of the curved sleeve or plate 22 and will be engaged by the teeth of the sprocket E formed on the surfaces or shoulders 48—49 thereof.

After this narrow film has been through, and it is desired to run a wider film, the proper portions of the various elements above described are simultaneously effected to re-position the parts for the alignment of the exciter lamp and the slots with the proper light openings and to re-adjust the film engaging shoes similarly, as above described.

The device herein set forth is simple, compact, and accomplishes the several operations to be effected quickly and easily by the mere turning of handles or knobs so constructed and in relation with their cooperating mechanism that the operator has nothing to do or to think about as to the proper positioning of the film and the parts except turning of the knobs and handles.

The main features of the invention include ready shifting of the exciter lamps, of the photo-electric cell, and the lens combination unit; the ready removal of the elements forming the sound film trap for adjustment and repair; the passage of the film through the sound track in a curved or non-linear manner to maintain it taut as it passes through the trap.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. In a sound unit for motion picture projectors, a film engaging roller, a film feeding sprocket spaced therefrom, a film trap element disposed between the roller and the sprocket in such position as to cause the film to travel a non-linear path therebetween, said trap element having a plurality of spaced light apertures therein, and a plurality of pairs of shoulders on said trap element adapted to cooperate with films of different widths, said pairs of shoulders being in different planes and definitely positioned with regard to the respective light apertures.

2. In a sound unit for motion picture projectors, spaced film engaging and feeding elements, a sound trap element disposed therebetween and over which the film passes, said elements being so disposed to cause the film to travel over a non-linear path between said film engaging and feeding elements, said trap element having a cylindrical surface with its axis disposed substantially at right angles to the line of movement of the film thereover, said trap element having a plurality of spaced light apertures therein, and a plurality of pairs of shoulders on said trap element adapted to cooperate with films of different widths, said pairs of shoulders being in different planes and definitely positioned with regard to the respective light apertures.

3. In a sound unit for motion picture projectors, spaced film trap elements having adjacent oppositely curved surfaces with their axes parallel to each other and disposed substantially at right angles to the path of movement of the film between said elements, said elements having aligned light apertures of different areas therein, and a plurality of pairs of shoulders on one of said trap elements adapted to cooperate with films of different widths, said pairs of shoulders being in different planes and definitely positioned with regard to the respective light apertures.

4. A sound unit for motion picture projectors, which comprises spaced film engaging and feeding elements, a pair of film trap elements having oppositely curved film engaging surfaces, said trap elements disposed between the film engaging and feeding elements to cause the film to travel a non-linear path in moving therebetween, said film trap elements having pairs of aligned light apertures of different sizes therein, one of said trap elements having a plurality of pairs of shoulders adapted to cooperate with films of different widths, said pairs of shoulders being in different planes and definitely positioned with regard to the respective light apertures, a lens combination and exciter lamp unit supported adjacent one side of said film trap elements, and a handle means connected to said lamp and lens combination unit and movable to shift said unit into alignment with one or the other sets of light apertures in the film trap.

5. A sound unit for motion picture projectors which comprises a pair of spaced film trap elements each having at least two aligned light apertures of different sizes, said elements having oppositely curved surfaces with their axes disposed parallel to each other and in a direction substantially at right angles to the direction of movement of the film passing therebetween, one of said trap elements having a plurality of pairs of shoulders adapted to cooperate with films of different widths, said pairs of shoulders being in different planes and definitely positioned with regard to the respective light apertures, a lens combination and exciter lamp unit supported adjacent one of said trap elements, and a handle means connected to said lens combination and lamp unit and movable to shift said unit to align it with either set of apertures in the trap elements.

6. A sound unit for motion picture projectors which comprises a plate supported from the frame of the projector, and having a bore therein at right angles thereto, a sleeve the end of which is fitted into said bore and projecting from said plate, said sleeve having oppositely disposed light openings therein at right angles to its axis, a film engaging trap element having machined surfaces and in the form of a partial cylinder disposed over one side of said sleeve, said trap element having spaced light apertures therein of different sizes, said trap element having a plurality of pairs of shoulders thereon adapted to cooperate with films of different widths, said pairs of shoulders being in different planes and definitely positioned with regard to the respective light apertures.

7. A sound unit for motion picture projectors which comprises a plate supported from the frame of the projector, and having a bore therein at right angles thereto, a sleeve the end of which is fitted into said bore and projecting from said plate, said sleeve having oppositely disposed light openings therein at right angles to its axis, a film engaging trap element having machined surfaces and in the form of a partial cylinder disposed over one side of said sleeve, said trap element having spaced light apertures therein of different sizes, a plurality of pairs of shoulders on said trap element adapted to cooperate with films of different widths, said pairs of shoulders being in different planes and definitely positioned with regard to the respective light apertures, and a second film trap element comprising a plate having a curved face adjacent the other trap element and with aligned light apertures therein of similar dimensions, said second trap element supported parallel to the first trap element and mounted on and from said supporting plate.

8. A sound unit for motion picture projectors which comprises spaced film trap elements having adjacent oppositely curved surfaces, with at least two sets of aligned light apertures therein of different sizes, said surfaces having their axes substantially parallel and at right angles to the direction of movement of the film therebetween, film engaging and feeding means on opposite sides of said film trap elements, a photo-electric cell disposed on one side of said trap elements in line with the axis through said light apertures, a lens combination and exciter lamp unit disposed on the other side of said trap elements and with its axis substantially parallel to the optical axis through the light apertures in said elements, means on the film engaging and feeding means for guiding the film therearound, one of said trap elements provided with a plurality of pairs of shoulders adapted to cooperate with films of different widths, said pairs of shoulders being in different planes and definitely positioned with regard to the respective light apertures, means on the lens combination and lamp unit for shifting it to align it with one or another of said sets of light apertures, manually operable means releasing the film from the engaging and feeding means, and means for adjusting the photo-electric cell to align it with one or another of the said sets of light apertures in said trap.

9. A sound unit for motion picture projectors which comprises a supporting plate, a cylindrical sleeve extending therefrom and having oppositely disposed light apertures therein at right angles to the axis of the sleeve, a film engaging semi-cylindrical plate spaced from one side of said sleeve and having a pair of light apertures therein in alignment with the apertures in said sleeve, said semi-cyindrical plate adapted to engage the film as it passes thereover in a curved line, a plurality of pairs of shoulders on said plate adapted to cooperate with films of different widths, said shoulders being in different planes and definitely positioned with regard to the respective light apertures.

10. A sound unit for motion picture projectors which comprises a sound trap element having a plurality of spaced light apertures therein, a plurality of pairs of shoulders on said trap element adapted to cooperate with films of different widths, said shoulders in pairs being in different planes and definitely positioned with regard to the respective light apertures, a film engaging roller on one side of said trap element, a film engaging and feeding sprocket on the other side of said element, an upper film engaging means for holding said film in contact with said roller, a lower film engaging means for holding said film against said sprocket, and means for simultaneously moving said upper and said lower film engaging means to and from said roller and sprocket respectively.

11. A sound unit for motion picture projectors which comprises a sound trap element having a plurality of spaced sound light apertures therein, a plurality of pairs of shoulders on said trap element adapted to cooperate with films of different widths, said shoulders in pairs being in different planes and definitely positioned with regard to the respective light apertures, a film engaging roller on one side of said trap element, a film engaging and feeding sprocket on the other side of said trap element, a set of shoes for holding said film against said roller, a second set of shoes for holding the film againt said sprocket, and means for simultaneously moving said sets of shoes to and from said roller and sprocket respectively.

12. A sound unit for motion picture projectors which comprises a sound trap element, having a plurality of spaced light apertures therein, a plurality of pairs of shoulders on said trap element adapted to cooperate with films of different widths, said shoulders in pairs being in different planes and definitely positioned with regard to the respective light apertures, a film engaging roller on one side of said trap element, a film engaging and feeding sprocket on the other side of said trap element, a pair of shoes having sets of shoulders in different planes for engaging films of different widths and adapted to bear against said roller, a second pair of shoes having sets of shoulders in different planes for engaging films of different widths and adapted to bear against the sprocket, and means for simultaneously moving said shoes to and from said roller and sprocket respectively.

13. In a sound unit for motion picture projectors, the combination which comprises a pair of spaced film trap elements having adjacent, oppositely curved surfaces, said elements having aligned light apertures of different areas therein.

14. In a sound unit for motion picture projectors the combination which comprises a pair of parallel spaced plates having adjacent, curved film engaging surfaces, said plates having a plurality of respectively aligned light apertures therein, whereby films having differently spaced sound tracks may be passed between the plates.

15. In a sound unit for motion picture projectors, a film trap element having a plurality of spaced light apertures therein and means constructed and arranged to enable the accommodation of different widths of film.

ALBERT KINDELMANN.
EWALD BOECKING.